May 1, 1928.

F. P. REED ET AL 1,668,087

COOKING VESSEL

Filed Nov. 29, 1926

INVENTORS
F.P.Reed–C.F.Strohm
BY
ATTORNEY

Patented May 1, 1928.

1,668,087

UNITED STATES PATENT OFFICE.

FRED P. REED AND CHARLES F. STROHM, OF STOCKTON, CALIFORNIA.

COOKING VESSEL.

Application filed November 29, 1926. Serial No. 151,356.

This invention relates to domestic cooking vessels, and particularly to pots and kettles. The object of the invention is to produce a cooking pot so arranged as to cook uniformly from both the bottom and sides of the pot, and in which there will be no excessive heat losses or undue evaporation of moisture. It is known that if food in a vessel can be cooked equally from both the bottom and sides the cooking operation is much quicker and much more uniform than where the heat is applied solely at the bottom of the vessel.

A further object of the invention is to so arrange the vessel that there will be very little chance of any of the food in the vessel sticking to the bottom of the vessel or burning. It is well known that in foods with starches in them the starch tends to precipitate to the bottom and very quickly stick and burn, and this condition is substantially avoided by the use of our improved apparatus.

A still further object of the invention is to provide a cooker in which obnoxious odors emanating from the cooking foods are entirely eliminated, as is likewise the escape of steam into the room in which the cooker may be used.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
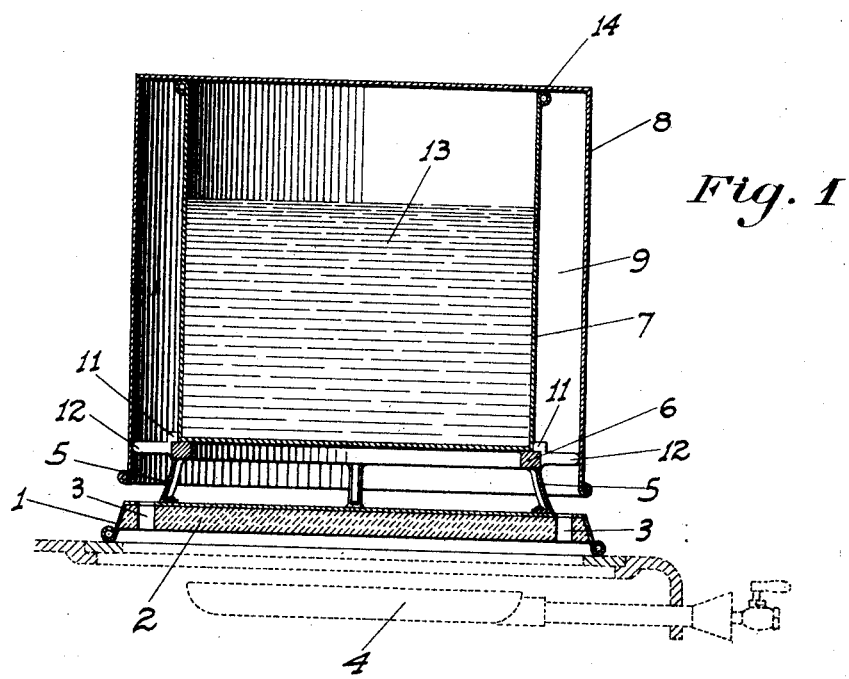
Fig. 1 is a vertical section through our improved cooking vessel.
Figure 2:
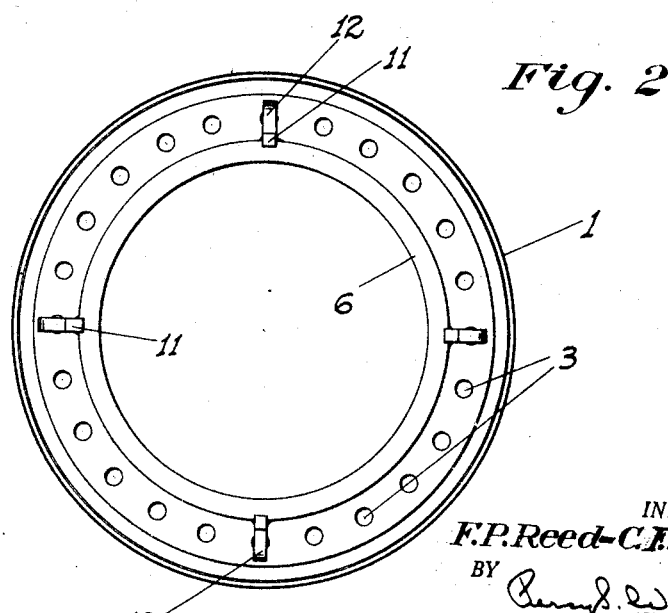
Fig. 2 is a plan view of the vessel support.

Referring now more particularly to the characters of reference on the drawings, in carrying out our improved invention we preferably provide a base plate consisting of a concave casing 1 filled in for a part of its depth with a filler 2 consisting of a composition of slate and asbestos. The base plate 2 is provided with a plurality of circumferentially disposed orifices 3 near its outer periphery. The plate 1 is arranged to be set over the source of heat as from a gas burner 4 or the like, and the composition layer of slate and asbestos is such as to distribute and radiate most of the heat toward and through the orifices 3.

Arranged on the plate 1, preferably within the circumferential line of the orifices 3 are small supporting legs 5 having at their upper end a supporting ring or like structure 6 on which the cooking vesel proper 7 may be placed. An outer cover vessel 8 is arranged to be disposed in inverted relation over the vessel 7, and is of a greater diameter than such vessel 7 so as to form an intermediate circumferentially disposed space 9 between the two vessels 7 and 8. The depth of the vessel 8 is such that when placed in inverted position over the vessel 7 the lower edge of such vessel 8 will be spaced a slight distance above the plate 1, leaving an intervening air space as at 10. The proper centering of the vessel 7 on the ring 6 may be fixed by means of small lugs 11 extending upwardly from the said ring between which the vessel 7 will fit when placed on the ring. Similarly the proper centering of the vessel 8 with respect to the vessel 7 may be fixed by means of projecting lugs 12 extending horizontally outward from the ring 6 over which the side walls of the vessel 8 will fit, and these lugs 12 will prevent any out of center displacement of the said vessel 8. It will be apparent that any other suitable centering means for either of the vessels may be used, but this construction we believe to be the preferrd form for that purpose.

In practice the material to be cooked will be placed in the vessel 7 as for instance at 13, and such vessel 7 placed on the ring 6, which will hold it in spaced relation above the plate 1. The cover vessel 8 will then be placed in inverted relation over the vessel 7 as shown and make a closure for the top of the vessel 7 as at 14. The fire from the burner element 4 will strike against the composition material 2 of the plate 1, and the nature of this composition is such as to uniformly distribute the heat throughout the entire plate, and the direct fire or combustion escaping, together with the heat therefrom, will pass up through the openings 3 into the space between the plate 1 and the bottom of the vessel 7 and also into the space 9 between the inner and outer vessels 7 and 8. Thus since the vessel is spaced directly above the heating plate, and the heat and products of combustion will pass freely around the vessel 7, and the space 10 will allow enough air circulation to prevent excess heat from striking the vessel 7, it will be apparent that there will be very little opportunity of any of the food sticking or burning to the bottom of the vessel.

It will be obvious that uniform application of the heat to the bottom and sides of the vessel 7 will make the cooking operation much quicker and the food will be more uniformly cooked.

The weight of the outer vessel 8 depending over the inner vessel 7 will tend to prevent excessive escape of steam from the cooking vessel, and such small amount as does escape will move down into the space 9 into which the combustion from the holes 3 is discharging, and will be completely consumed, thus adding to the heat value around the receptacle 7, and at the same time consuming and destroying the obnoxious odors, and fumes and steam which ordinarily escape from a cooking vessel.

We have found from experience that there is very little direct evaporation from the cooker. As a matter of fact out of three pounds of water under ordinary cooking conditions only approximately three ounces of the same evaporated in an hour and a half of cooking. From this it will readily appear that in the ordinary household cooking there will be very little chance of a sufficient evaporation occurring under any circumstances to cause the food to become void of moisture and burn or stick to the vessel.

Such odors as arise from sundry vegetables, such as onions, cabbage or other like foods, have been completely absent when these materials were cooked in a cooker constructed as herein described.

It will also be apparent that in cooking in a vessel of the construction here described, the fact that the steam remains largely within the inner vessel will cause the food to be cooked under a certain amount of steam pressure which, as is well known, causes a much better and more perfect cooking operation to be had, and furthermore by controlling the steam and holding the condensation within the cooker the vital vitamines in the food are substantially all saved, instead of being lost in the steam evaporation.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A cooking apparatus including a primary vessel, a secondary vessel to rest in inverted position over the primary vessel and being supported thereby and forming the top closure therefor and having its side walls spaced from the side walls of the primary vessel, means to distribute and maintain heat around the bottom and sides of the primary vessel within the secondary vessel, such means including a base plate to rest over a combustion element, and a support above the base plate on which the primary vessel may rest, the base plate having a plurality of orifices disposed circumferentially adjacent its outer periphery.

2. A cooking apparatus including a primary vessel, a secondary vessel to rest in inverted position over the primary vessel and being supported thereby and forming the top closure therefor and having its side walls spaced from the side walls of the primary vessel, means to distribute and maintain heat around the bottom and sides of the primary vessel within the secondary vessel, such means including a base plate to rest over a combustion element, and a support above the base plate on which the primary vessel may rest, the base plate having a plurality of orifices disposed circumferentially adjacent its outer periphery, such orifices being in substantial alinement with the space between the vessels.

3. A cooking apparatus including a primary vessel, a secondary vessel to rest in inverted position over the primary vessel and being supported thereby and forming the top closure therefor and having its side walls spaced from the side walls of the primary vessel, means to distribute and maintain heat around the bottom and sides of the primary vessel within the secondary vessel, such means including a base plate to rest over a combustion element, a support above the base plate on which the primary vessel may rest, and means to maintain the axes of the two vessels centered relative to each other and to the base plate.

4. A cooking apparatus including a primary vessel, a secondary vessel to rest in inverted position over the primary vessel and being supported thereby and forming the top closure therefor and having its side walls spaced from the side walls of the primary vessel, means to distribute and maintain heat around the bottom and sides of the primary vessel within the secondary vessel, such means including a base plate of heat insulating material to rest over a combustion element, and a support above the base plate on which the primary vessel may rest.

5. A cooking apparatus including a primary vessel, a secondary vessel to rest in inverted position over the primary vessel and being supported thereby and forming the top closure therefor and having its side walls spaced from the side walls of the primary vessel, means to distribute and maintain heat around the bottom and sides of the primary vessel within the secondary vessel, such means including a base plate to rest over a combustion element, and a support above the base plate on which the primary vessel may rest, the bottom edge of the secondary vessel normally resting below the bottom of the primary vessel and above the base plate when the parts are assembled for use.

6. A cooking apparatus including a primary vessel, a secondary vessel to rest in inverted position over the primary vessel and being supported thereby and forming the top closure therefor and having its side walls spaced from the side walls of the primary vessel, means to distribute and maintain heat around the bottom and sides of the primary vessel within the secondary vessel, such means including a base plate to rest over a combustion element, and a support above the base plate on which the primary vessel may rest, the bottom edge of the secondary vessel normally resting below the bottom of the primary vessel and above the base plate to form an air space between the base plate and the bottom edge of the secondary vessel when the parts are assembled for use.

In testimony whereof we affix our signatures.

FRED P. REED.
CHARLES F. STROHM.